US012254894B2

(12) United States Patent
Samant et al.

(10) Patent No.: US 12,254,894 B2
(45) Date of Patent: Mar. 18, 2025

(54) SYSTEMS AND METHODS FOR EMOTION DETECTION, PREDICTION, ANNOTATION, AND COACHING

(71) Applicants: Maithilee Lalit Samant, Los Gatos, CA (US); Barry Randall Schrag, Issaquah, WA (US); Rajashree Suresh Varma, Sammamish, WA (US)

(72) Inventors: Maithilee Lalit Samant, Los Gatos, CA (US); Barry Randall Schrag, Issaquah, WA (US); Rajashree Suresh Varma, Sammamish, WA (US)

(73) Assignee: Mirro.ai, Los Gatos, CA (US)

( * ) Notice: Subject to any disclaimer, the term of this patent is extended or adjusted under 35 U.S.C. 154(b) by 287 days.

(21) Appl. No.: 18/073,952

(22) Filed: Dec. 2, 2022

(65) Prior Publication Data

US 2024/0185880 A1 Jun. 6, 2024

(51) Int. Cl.
*G10L 25/72* (2013.01)
*G06V 40/16* (2022.01)
*G10L 25/54* (2013.01)
*G10L 25/63* (2013.01)

(52) U.S. Cl.
CPC ............ *G10L 25/72* (2013.01); *G06V 40/176* (2022.01); *G10L 25/54* (2013.01); *G10L 25/63* (2013.01)

(58) Field of Classification Search
CPC ....... G06F 16/683; G06F 16/68; G06F 16/635
USPC .......................................................... 700/94
See application file for complete search history.

(56) References Cited

U.S. PATENT DOCUMENTS

| | | | |
|---|---|---|---|
| 11,483,574 B2 * | 10/2022 | Coza | H04N 19/162 |
| 2020/0193206 A1 * | 6/2020 | Turkelson | H04N 25/00 |
| 2023/0347903 A1 * | 11/2023 | Katz | G06V 20/597 |
| 2024/0362931 A1 * | 10/2024 | Katz | G06V 40/20 |

* cited by examiner

*Primary Examiner* — Alexander Krzystan
(74) *Attorney, Agent, or Firm* — PatentPC PowerPatent; Bao Tran

(57) ABSTRACT

A system that performs emotion detection, prediction, and coaching system is disclosed. The system includes a media feature extractor, which extracts features from different media modalities, a perceiver module which detects or predicts emotional response for a given audience, a coaching module that generates context-based, personalized coaching in the form of commentary, retrospective analysis, tips kudos, events, and scores. The intermediate results, like media feature, perceiver output, and context, are stored in an emotion association database, which can be used as reference data by the system.

20 Claims, 11 Drawing Sheets

First Aspect: Commentary / Retrospect Analysis

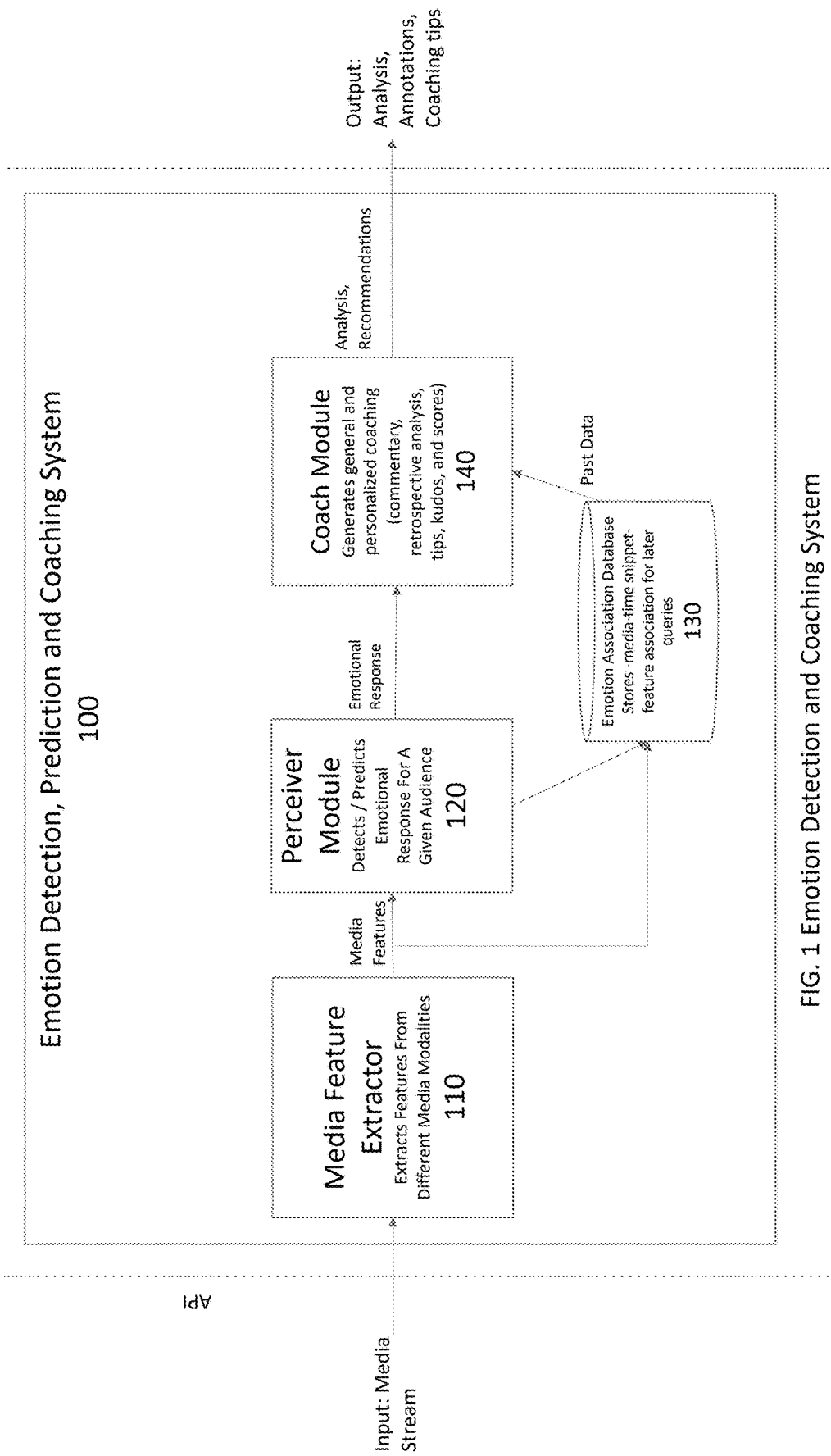
FIG. 1 Emotion Detection and Coaching System

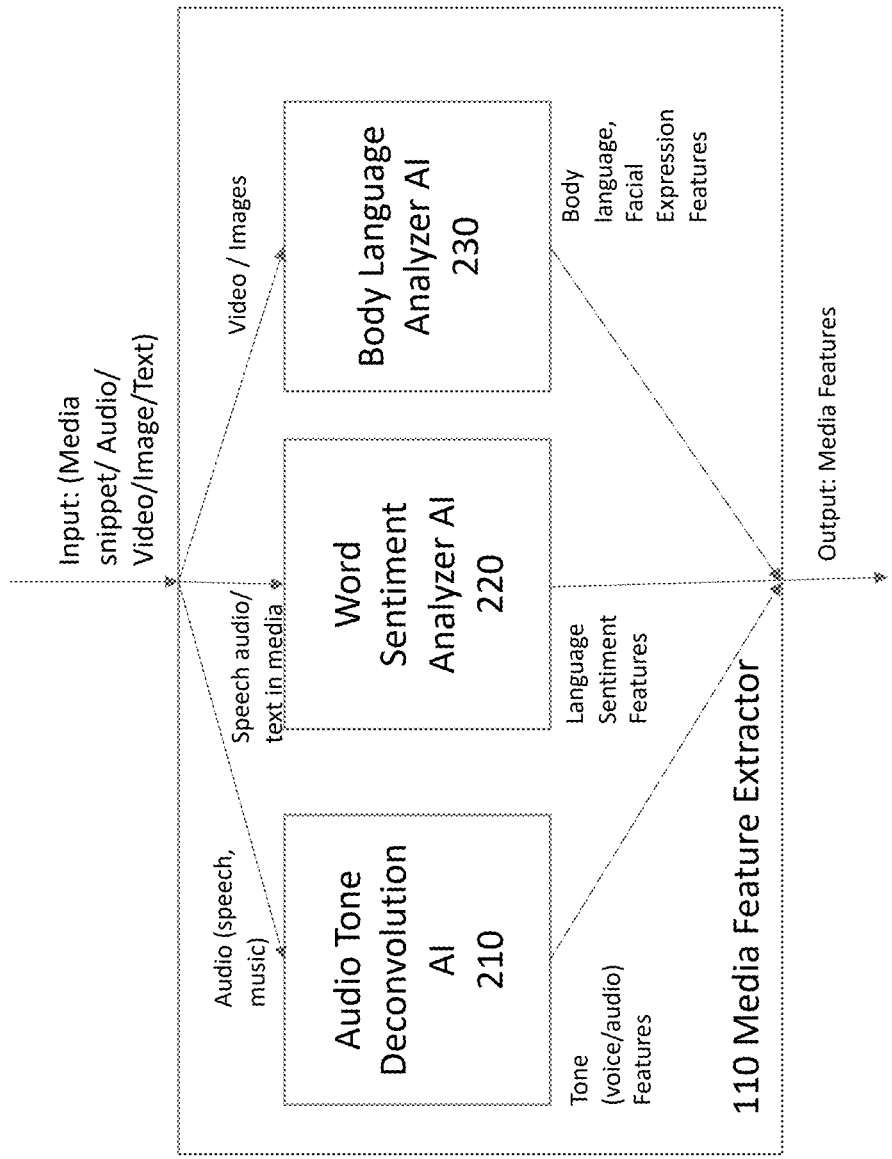
FIG. 2 Media Feature Extractor Module, Implementation #1

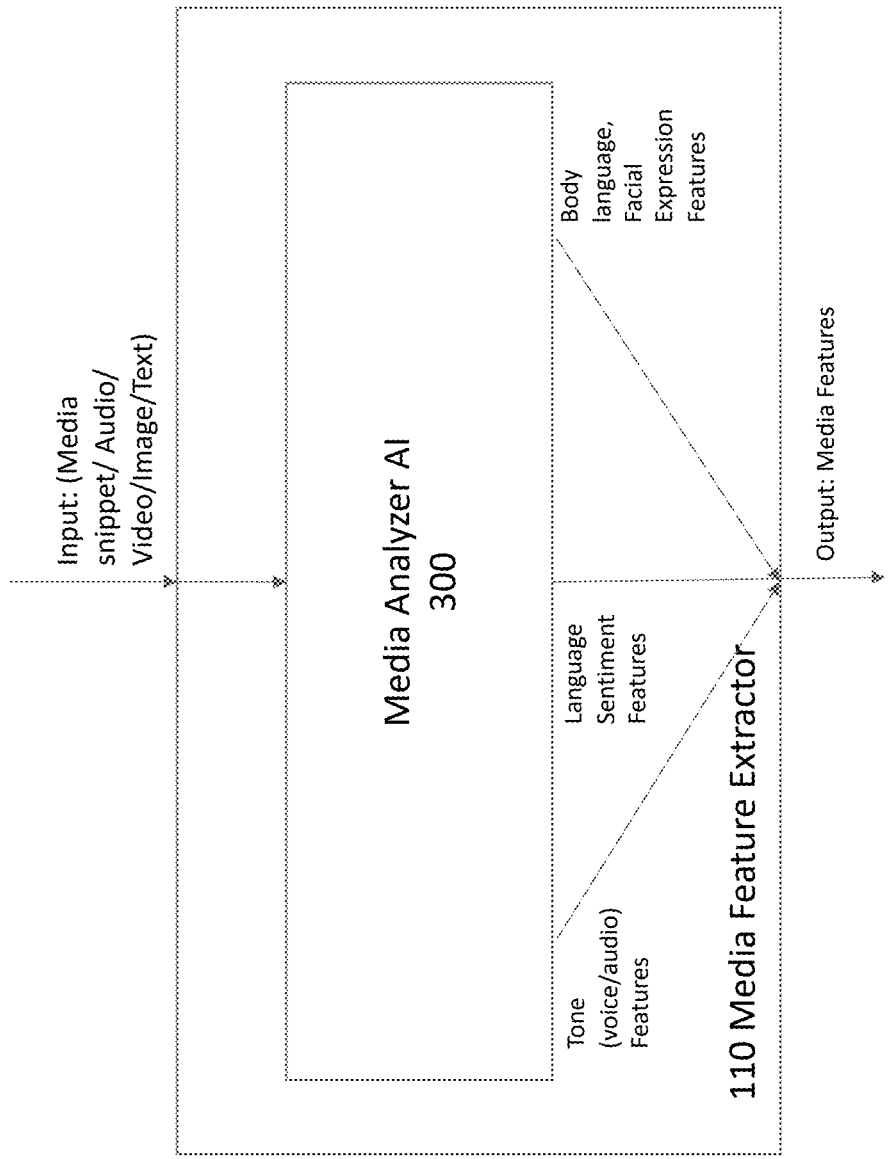
FIG. 3 Media Feature Extractor Module, Implementation #2

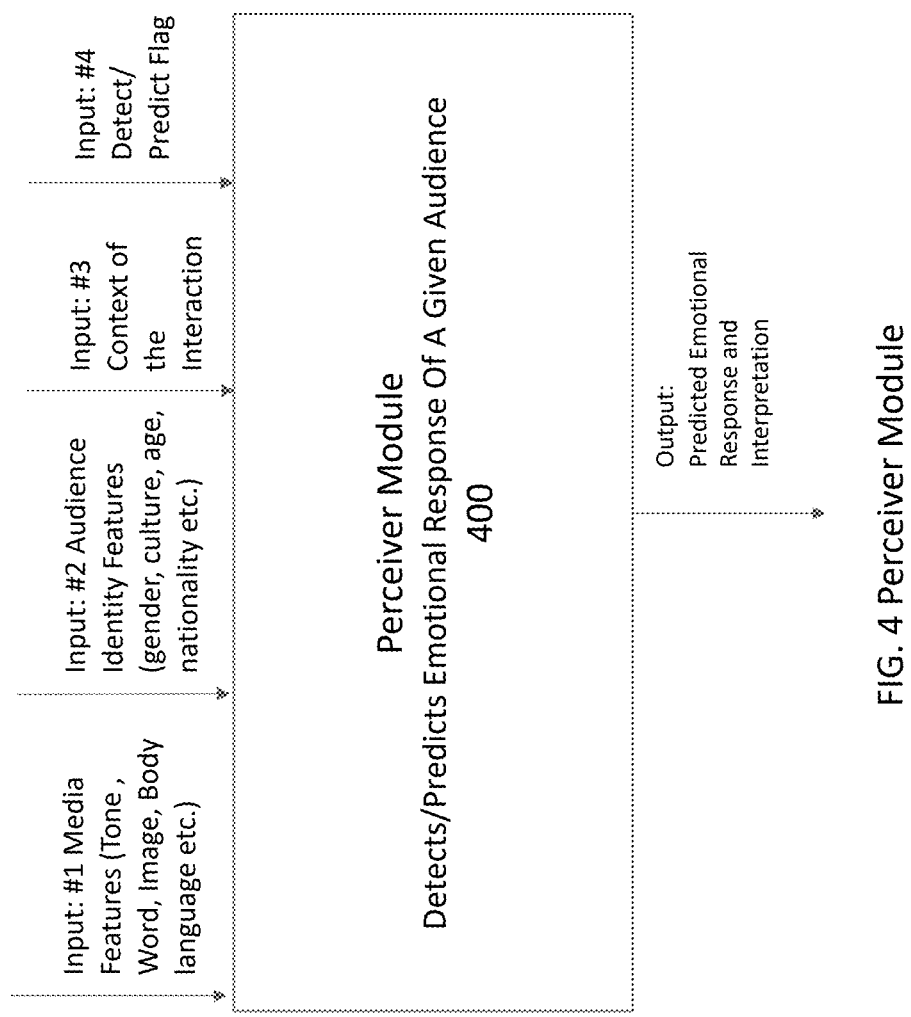
FIG. 4 Perceiver Module

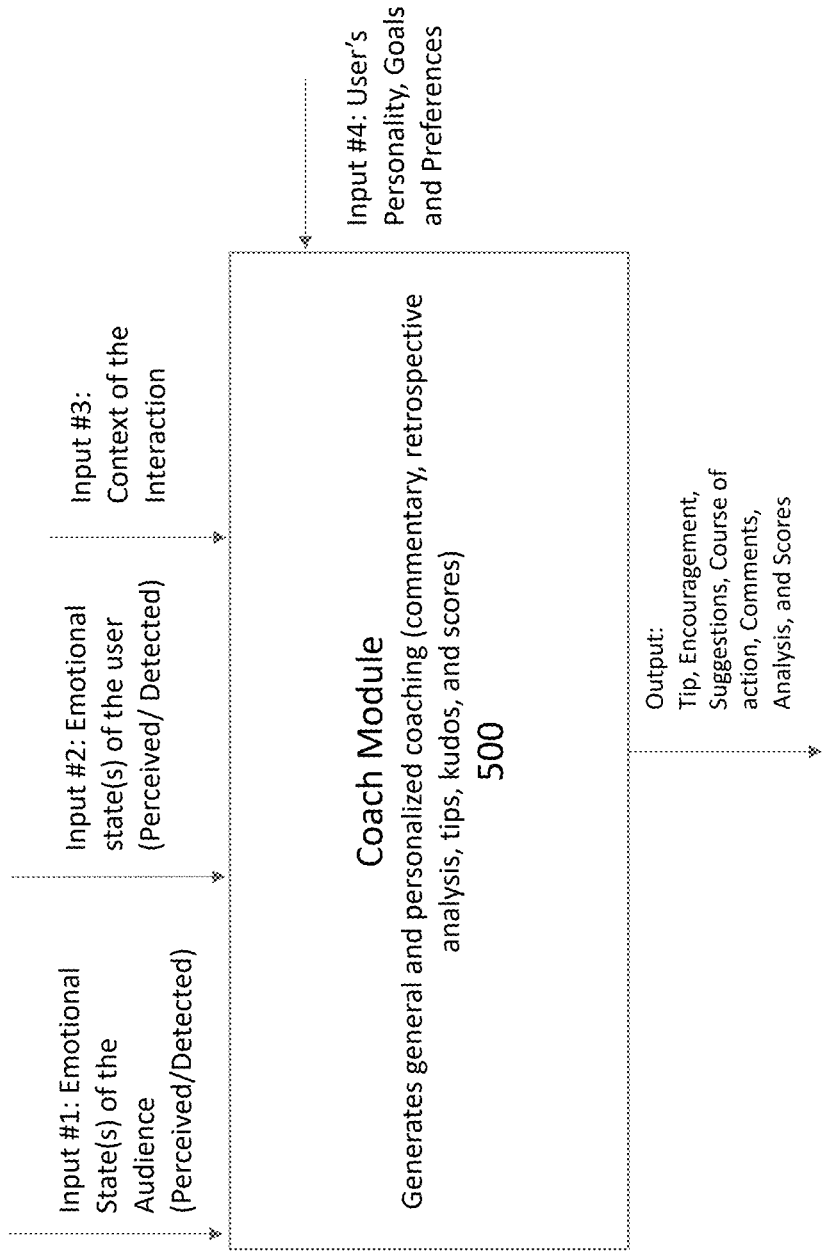
FIG. 5 Coach Module

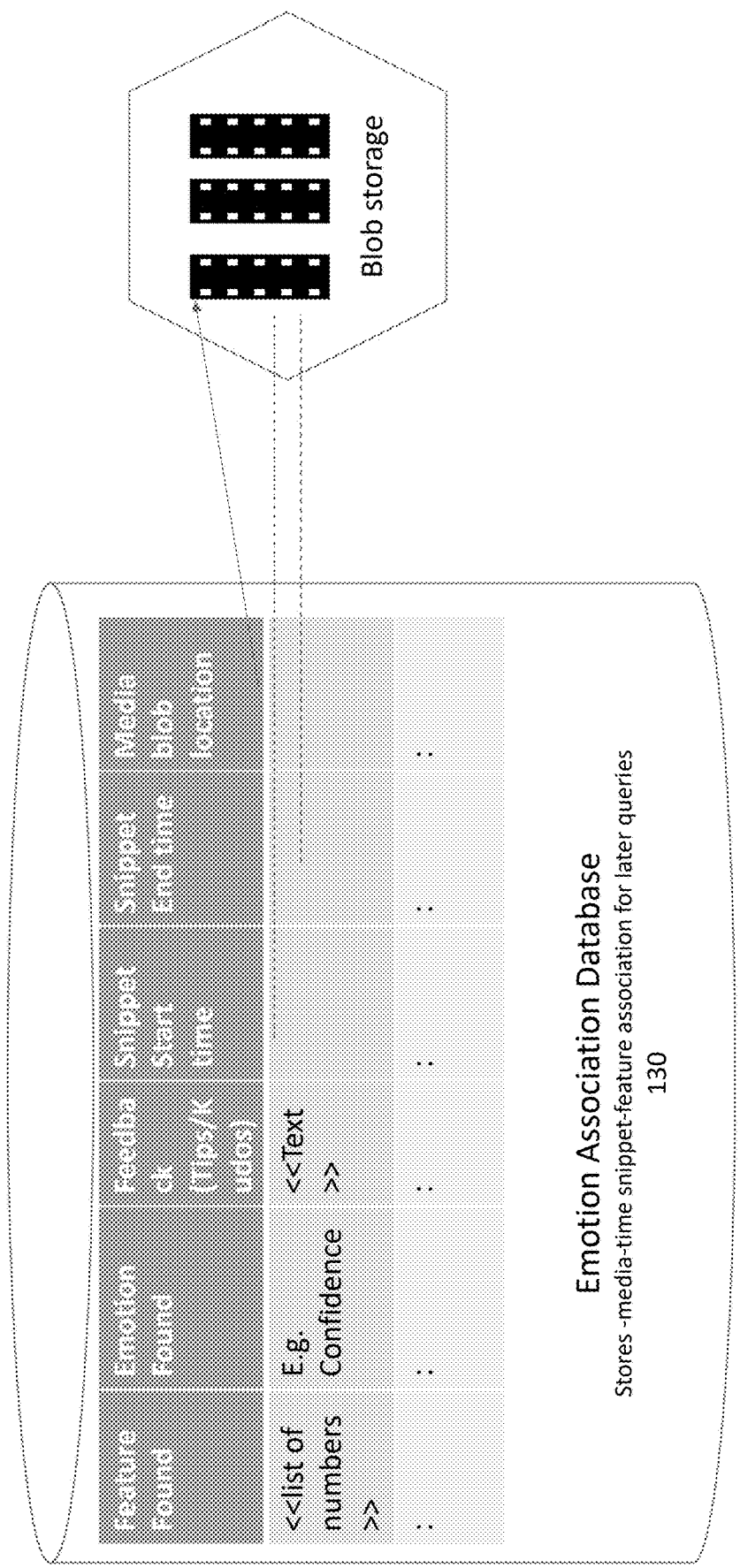
FIG. 6 Emotional Association Database Module

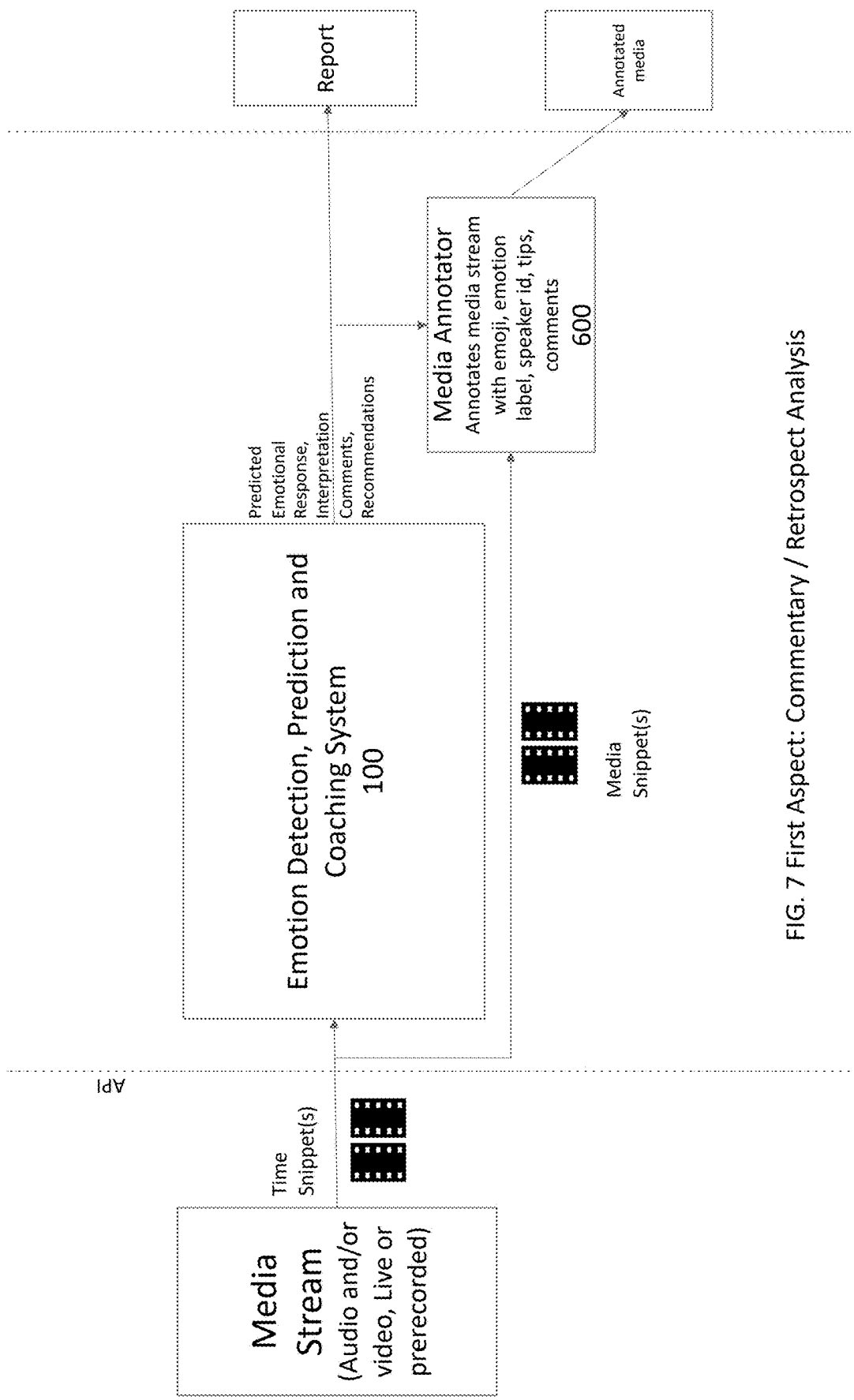
FIG. 7 First Aspect: Commentary / Retrospect Analysis

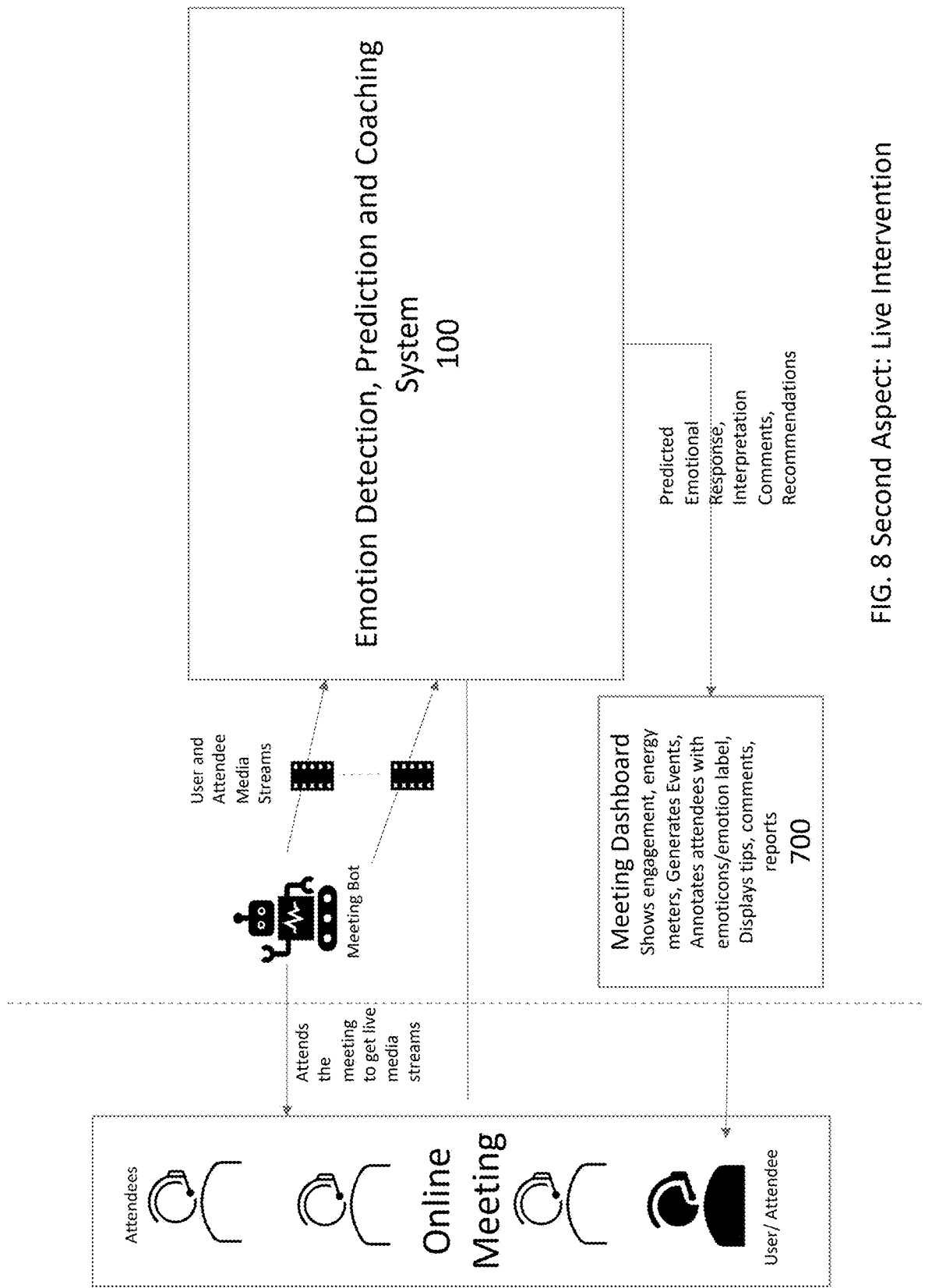
FIG. 8 Second Aspect: Live Intervention

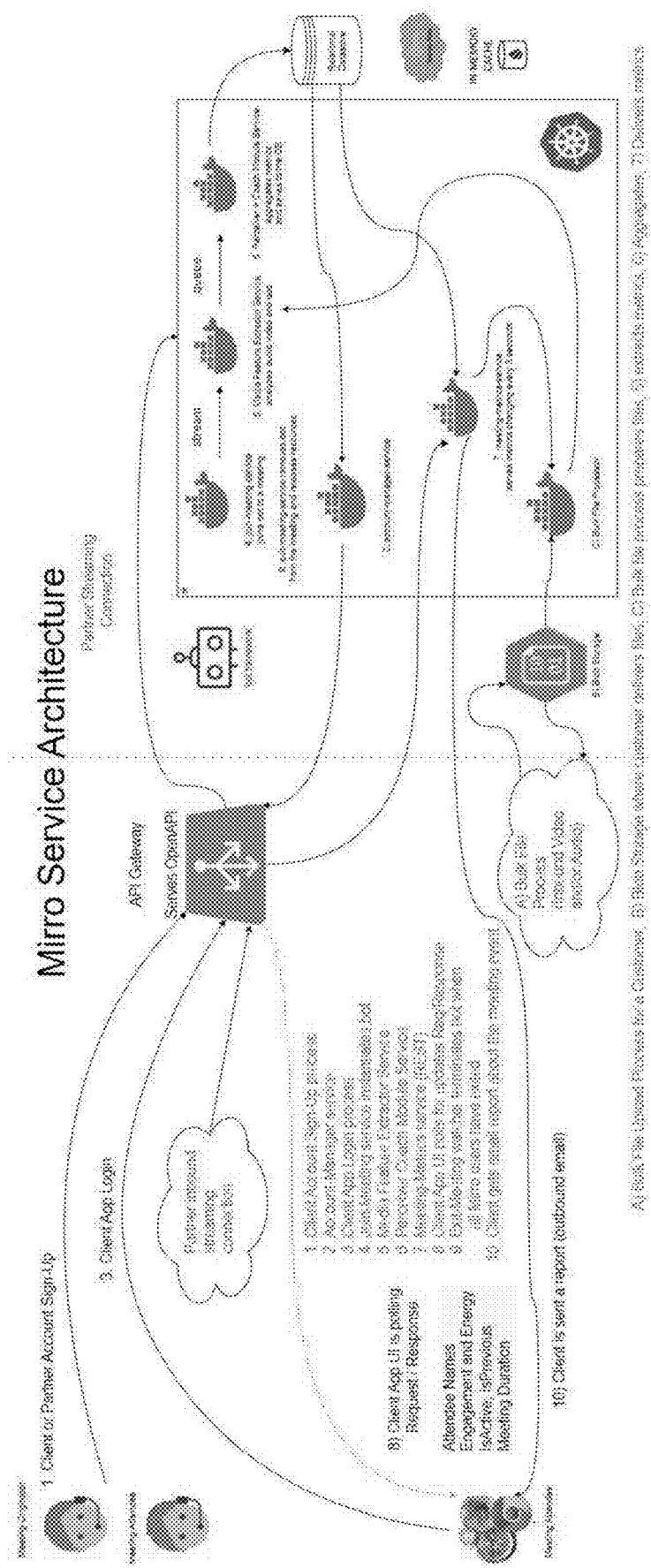
FIG. 9 Example Architecture With Data Flow Chart

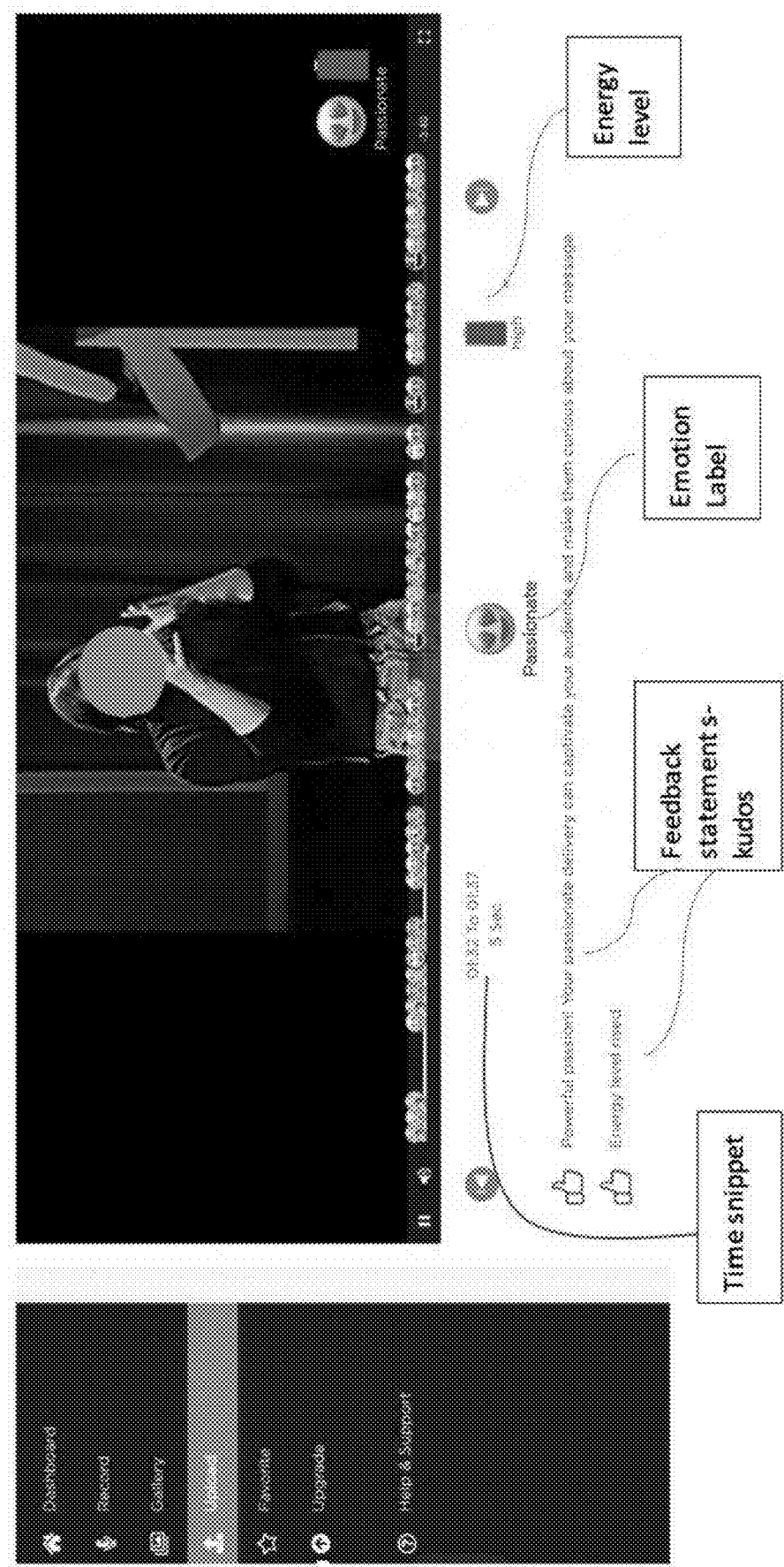
FIG. 10 UI Example Of Annotated Media Snippet with Annotations

FIG. 11 UI Example of Meeting Dashboard

SYSTEMS AND METHODS FOR EMOTION DETECTION, PREDICTION, ANNOTATION, AND COACHING

BACKGROUND

This invention relates to machine-trained emotion analysis and metrics.

Humans communicate with one another to share information, influence one another, and persuade one another. Communication includes both speech and non-speech vocalizations. Nonverbal communication and visual communication can be significant part of human communication. Human faces can display a variety of facial expressions which can be made consciously or unconsciously. They can communicate fundamental information like cognitive content, thoughts, emotions, reactions, and more. Facial expressions can be created by the physical movements and positions of facial muscles. Expressions can be created by the movements and positions of body or facial muscles, which convey a variety of cognitive states, from happy to sad.

Non-verbal communication can be made between people without exchanging words. Non-verbal communication can be made as visual cues and voice cues. Visual cues can include facial expressions and body language. A smiling face or an angry face can convey opposing messages. Information can also be provided by physical distance cues. For example, standing taller than the other person can be dangerous, but sitting down with them can be more comforting. Voice cues, called paralanguage, include rate, pitch, volume, voice quality, or prosody. Rapid speech, which can be loud or rapid, can signify anger or alarm. Softer speech can indicate comfort or ease. Non-verbal communication can also be done using touch or haptic cues. A handshake can signal confidence or welcome, while a welcoming touch can indicate affection. An unwelcome touch can be a source of anger or disgust, and is in stark contrast to a welcome touch.

While a good reading of emotional expressions can make a difference in service industries such as sales or education, it remains underexplored how machines can support emotion analysis for human-human interactions and how humans and machines interact with each other.

SUMMARY

A system that performs emotion detection, prediction, and coaching system is disclosed. The system includes a media feature extractor, which extracts features from different media modalities, a perceiver module which detects or predicts emotional response for a given audience, a coaching module that generates context-based, personalized coaching in the form of commentary, retrospective analysis, tips kudos, events, and scores. The intermediate results, like media feature, perceiver output, and context, are stored in an "emotion association database," which can be used as reference data by the system.

Implementations can include one or more of the following. The system can perform commentary/retrospect analysis by annotating a media stream to assign a speaker's emotion and energy level by analyzing voice tone and/or word choice and/or body language. The media stream may be audio, video, or an audio and video stream. The media stream may be pre-recorded and uploaded for analysis. Alternatively, the media stream may be analyzed live through online meetings, media-broadcast, or presentations in real-time. The emotions, energy, and coaching feedback will be generated and stored for later queries, reports, and analytics. Such analytics, feedback, and emotions can be annotated on the input media clip to provide embedded frame-by-frame analysis.

Other implementations can include one or more of the following. The system supports attending live events and online meetings and providing timely interventions via appropriate tips based on the attendees' emotional states, meeting context, and cultural context. The analysis and coaching feedback will be generated and will be communicated to the user in real-time via messages, annotations, and events. The analytics will also be stored for later queries and reports.

Advantages of the system may include one or more of the following. The system can objectively identify emotion to provide feedback to a speaker to understand and master the emotional dynamics for effective communication. The system is particularly effective for Online Meetings. Emotion is conveyed by voice tone, facial expression, body language, and words. Much of this information is lost when people communicate online. People tend to turn their cameras off. Even with the camera on eye contact is not possible. The problem compounds when sensing audience engagement in a virtual webinar/conference. The system can help interpret the emotional states of other cultures and enable a global workforce. Each culture has its communication nuances which need to be accounted for to understand the emotion being conveyed and conduct the communication in a way that is appropriate for that culture. The system can identify such cultural misunderstandings and avoid resulting relationship damage. The system helps users to effectively convey their message. The system operates in parallel with users who tend to focus on the rational content (the "what") of the message and, in that effort, and helps users to be mindful of how the message is being conveyed. Feedback on how a person communicates often comes through retrospective analysis after the communication is done. Though this could be useful in the future, it does not help during live communication. The near real-time feedback saves time, as a retrospective review of past meeting recordings can be tedious and time-consuming. In yet other advantages, the system can provide the ability to:

- process live/pre-recorded media which may contain multiple speakers, music, visuals, etc.
- identify and distinguish a broader range of high-level emotions (confidence, engagement, etc.) expressed and/or can be perceived by an audience than the basic three-four classes of tones/sentiments.
- predict how different audiences (genders, sexual orientations, ages, cultures, nationality, etc.) will perceive and emotionally respond to the content of the media stream.
- predict how a subject (customer, interviewee, student, etc.) will perceive and emotionally respond to the content of the media stream in a given context (sales meeting, work meeting, date, interview, student, etc.)
- identify the level of energy from audio and video.
- function on one or multiple of the modalities present in media: Audio, Video, and Word usage.
- identify high-level emotion from voice tone frees the system from transcription errors and language, accent, and culture limitations.
- provide commentary/retrospect on the emotional dynamics of the media clip/stream/snippet.
- annotate emotional analysis on the media clip/stream/snippet.
- provide live intervention in the form of tips, encouragement, course corrections, and call to action to the users based on the emotional state of their audience.

Various features, aspects, and advantages of numerous embodiments will become more apparent from the following description.

BRIEF DESCRIPTION OF THE DRAWINGS

The following detailed description of certain embodiments may be understood by reference to the following figures wherein:

FIG. 1 shows an exemplary emotion detection and coaching system.

FIG. 2 shows in more detail the exemplary Media Feature Extractor Module.

FIG. 3 shows in more detail another Media Feature Extractor Module using a Media AI Analyzer Module.

FIG. 4 shows in more detail the exemplary Perceiver Module.

FIG. 5 shows in more detail the exemplary Coaching Module.

FIG. 6 shows in more detail the exemplary Emotional Association Database Module.

FIG. 7 shows in more detail an exemplary embodiment of the First Aspect: Commentary/Retrospect Analysis.

FIG. 8 shows in more detail an exemplary embodiment of the Second Aspect: Live Intervention.

FIG. 9 shows in more detail an exemplary architecture with a data flow chart.

FIG. 10 shows in more detail an exemplary UI of annotated media snippet with annotations FIG. 11 shows in more detail an exemplary UI of Meeting Dashboard

DETAILED DESCRIPTION OF THE INVENTION

The following detailed description is made with reference to the figures. Sample implementations are described to illustrate the disclosed technology, not to limit its scope, which is defined by the claims. Those of ordinary skill in the art will recognize various equivalent variations in the following description.

This document describes architecture techniques employing software regarding specific example implementations. The discussion is organized as follows.

First, an introduction will be presented, describing some of the problems addressed by various implementations. Then, a high-level description of one implementation will be discussed at an architectural level. Next, the processes used by some implementations to efficiently process media and inertial data storage are discussed. Lastly, the technology disclosed will be illustrated with reference to particular applications of (i) Online meeting platforms and social media (ii) Robots and self-guided autonomous platforms, (iii) virtual reality headsets and wearable devices, and (iiv) augmented reality headsets and wearable devices. The references to specific examples are intended to be illustrative of the approaches disclosed herein rather than limiting.

Each embodiment disclosed herein may be used or otherwise combined with any of the other embodiments disclosed. Any element of any embodiment may be used in any embodiment. While the invention has been described by way of example and in terms of the specific embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

FIG. 1 shows an exemplary emotion detection and coaching system 100. The system includes a media feature extractor module 110 that extracts features from a plurality of media modalities whose output is provided to a perceiver module 120 that detects and predicts an emotional response for a given audience. Input data can include text, a video feed from a camera or a video source, and audio data from a recording or audio microphone, among others. The Video Data can be used to analyze facial expressions, facial recognition, identity confirmation or to identify cognitive states that are related to the individual. Voice data can also be used to analyze voice data for biometric confirmation or cognitive states. Cognitive states include frustration, ennui and confusion, cognitive overloads, skepticism or delight, satisfaction, calmness, or stress. Human voices and facial expressions are captured to analyze the levels of human communication.

In one embodiment, facial expressions are formed from the movements and positions of facial muscles. Expressions can be expressed in a variety of emotions, including anger, fear and disgust. It is possible to capture and analyze facial expressions. Emotion is also expressed in the human voice include timbre and prosody, vocal register and vocal resonance, pitch and loudness, language content and speech rate. This information is used to determine mental states, moods and emotions.

In another embodiment, body expressions are formed from the movements and positions of the arms, legs, and posture. The body expressions can express in a variety of emotions, including boredom or lack of interest, and in the case of folding arms, unconvinced posture. To describe body movement, the system breaks it down for each joint. The analysis can separate the movement at each joint into three planes. The sagittal plane is vertically located and divides the body into left and right parts. This plane allows forward and backward movement (flexion, extension). Although the frontal plane is also vertically located, it divides the body into an anterior and posterior part. This plane is responsible for lateral movements, which involve the limbs moving towards and away from the body. The transverse plane is horizontally located and divides the body in to superior and inferior. This plane is responsible for rotations and twisting motions (internal, external rotation). An axis is the straight line along which a limb revolves. A plane around an axis is where movement at a joint occurs. Each of these three planes has three axes for rotation. When analyzing a movement, the system maps the movement to the plane it is dominated by. Walking, for example, is often referred to as a movement in sagittal plane.

A database 130 receives data from the modules 110-120 and stores media time snippet feature association for subsequent analysis. The emotional response detected by the perceiver module 120 is provided to a coach module 140, which also receives prior data from the database 130. The coach module 140 generates general and personalized coaching through retrospective analysis, tips, or scoring data and the resulting recommendations are provided to the user.

One embodiment of the system 100 operates on text, audible and visible cues. These include speech and facial expressions. Human sounds and facial expressions play crucial roles in human communication at all levels. Human faces can display a variety of facial expressions. Facial expressions can be made consciously or unconsciously. They can communicate fundamental information that humans, regardless of culture, gender, geography or circumstance, exhibit such as: fear, anger, joy, sadness, disgust, surprise, moods, reactions, and particular mental states such as frustrations, ennui and confusion, cognitive overload, skepticism delight, satisfaction calmness, and stress, among others.

The "Emotion Detection, Prediction, and Coaching System," of FIG. 1 can detect or predict users'/audience's emotional responses and provide coaching live or retrospectively. The detected and/or predicted user and audience responses, cultural context, and user goals and preferences are used to coach the user with a suggested course of action. The system uses machine learning algorithms as applied to multiple data streams (voice, video, text) to analyze emotion, and such detected expressions can be used for creating positive effects on potential customers.

FIG. 2 shows in more detail the exemplary Media Feature Extractor Module 110. As illustrated in FIG. 2, the media feature extractor module can be implemented so that different modalities (audio, images, text, speech-to-text) in the input media will be analyzed separately. For example, the audio stream can be deconvoluted by "Audio tone deconvolution." Deconvolution attempts to recreate the signal in its original form before convolution. It is usually necessary to know the characteristics of the convolution, i.e. the impulse or frequency response. This is different from blind deconvolution where the characteristics are unknown. In the frequency domain, each sinusoid of the original signal that makes up the deconvolution can be altered in its amplitude or phase as it passes through the convolution. The deconvolution filter can reverse these phase and amplitude changes in order to extract the original signal.

Image features can be extracted by the module 110. Computer Vision techniques for feature detection include: Harris Corner detection which uses a Gaussian function in order to detect corners, Shi-Tomasi Corner Detector which uses a modified scoring function in Harris Corner Detection, Scale Invariant Feature Transformation (SIFT), Speeded Up Robust Features (SURF), FAST Features, Binary Robust Independence Elementary Features (BRIEF), or Oriented HTMLAST and Rotated BRIEF, among others.

Speech can be converted into text and the text features can be extracted. The system can apply text feature extraction methods such as fusion, mapping and clustering. The filtering method is particularly useful for large-scale text feature extraction. Text feature extraction is primarily filtered using word frequency, mutual information, and information gain. Word frequency is the frequency at which a word appears within a text. To reduce the dimension of the feature space, feature selection by word frequency refers to deleting words whose frequency is less than a threshold. This is based upon the hypothesis that words with low frequencies have little effect on filtering. Information sharing can be used to measure mutuality between two objects. It is used to determine the differentiation of topics and features in filtration. It is very similar to cross entropy. Mutual information is a concept from information theory that was used to describe relationships between information and statistical correlations of two random variables. The mutual information theory can be used to extract feature information on the assumption that words are more common in certain classes than in others. Mutual information is the measurement between feature words and classes. If the feature word is part of a class, it has the greatest amount of mutual information. This method is suitable for registration of features of text classification or classes. Information gain (IG) can be used to determine whether a feature is present in a topic's text and how much information it contains. Information gain can be used to find features that are more common in positive samples than negative ones, or vice versa. Information gain is an evaluation method that uses entropy. It involves many mathematical theories, complex theories, and formulae about entropy. It refers to the amount of information a particular feature item can provide for the entire classification.

In one embodiment, artificial intelligence (AI) is used to extract emotional features from the audio (e.g., aggression, compassion, fatigue, happiness, etc.) and, optionally, the identity of the subject of a media clip, for example, where more than one speaker is recorded, all done in an audio tone deconvolution AI module 210. The language in the media can be separately analyzed by a "word sentiment analyzer" AI module 220, which outputs language sentiment features (E.g., assurance, contemplation, etc.). The video and images in the media can be independently analyzed by a "body language analyzer" AI module 230, which outputs body language and facial expression features. (E.g., frown, smile, animated, etc.). The media feature extractor thus outputs a comprehensive set of features from the input media. An energy level may be assigned, such as low energy, medium energy, and high energy level.

An alternate implementation of the "media feature extractor" module is illustrated in FIG. 3. Instead of separating media based on each modality, a single media analyzer AI can take the media as an input and produce an output of media features based on tone, language, and body language.

FIG. 4 shows an exemplary Perceiver Module. As illustrated in FIG. 4, a perceiver module takes the following inputs: Input #1: media features (E.g., voice tone features, body language features, word sentiment features, etc.). Input #2: audience identity features (E.g., gender, culture, age, nationality, personality type, etc.). Input #3: the context of the interaction which could be the type of meeting (E.g., work meeting with the supervisor, Date, etc.). Input #4: The "detect/predict" flag If the "detect/predict" flag is set to "detect," the perceiver module detects the emotional state of the subject in the media (Input #1) for the given audience (Input #2) in the given context (Input #3)

If the "detect/predict" flag is set to "predict," the perceiver module predicts the given audience's (Input #2) emotional response to the media content (Input #1) in the given context (Input #3)

The "perceiver module" analyzes a combination of tone and/or word usage and/or body language and assigns an emotion label as per the audience (Input #2). The combination of the user's tone, word choice, and facial expression are analyzed to assign an emotional state like (and not limited to): excited, cheerful, pleased, passionate, composed, poised, relaxed, mellow, stressed, tense, nervous, uneasy, thinking, surprised, annoyed, weary, tired, disengaged, fatigued, reasoning, doubtful, or confident.

The AI deep learning can be supervised by the video on body movement or facial expressions. To extract emotional content from speech, it is possible to leverage the natural synchrony of speech and face for exchanging emotions. An autonomous training technique is used to align face/body movement with speech. An autonomous training technique is able to transfer discriminative facial/body expressions that are based on robust facial/body expression models into a speech modality.

In one embodiment, a computing device records a plurality information channels (voice, text, video). This includes contemporaneous audio information. Video Information from an individual can be captured. The audio information and the weight training are used to learn the trained weights. Video information from a variety of channels. The trained weights include both audio and visual information. Video information and are trained simultaneously. Where the learning facilitates emotional analysis from the Audio information and Video information. Multilayered convolutional networks include a multilayered convolutional computing network. The additional information is then analyzed using the trained weights to provide an analysis.

The architecture of the system is detailed next. Referencing FIG. 9, the architecture comprises a set of composable services where data flows from an inbound data source (previously saved file, or live stream) where pre-processing occurs for key point vector extraction in various modalities (text, tone, visual). Next the salient vectors are sent through a variable number of time series periodicity detectors which act like a multi-dimensional Discrete Fourier Transform (DFT). The discrete Fourier transform (DFT) is a method for converting a sequence of N complex numbers X0, X1, ..., XN−1 to a new sequence of N complex numbers:

$$X_k = \sum_{n=0}^{N-1} x_n e^{-2\pi i k n/N}$$

for $0 <= k <= N - 1$

DFT is used to reduce the features in the media. Emotion probability is then determined by nearest match through closest comparison to what becomes the historical baseline for the meeting type and role for all previous system training. Categories for each emotion are created i.e. 'trained' through updating or changing of the weights related to the probability of being in the category. Changes in the partitioning of the aggregated statistics of the data proceeds in a way similar to k-means clustering. Each bit of data processed will change the system's categories only slightly. Over time categories are formed based on the data on which the system is trained.

During training, data is stored as to provide opportunity to train and test for continuous improvement. Labeled data continually created by the company and is stored to provide for more robust testing. Training is performed both ad-hoc and continuously after altering the training datasets for dataset expansion.

The system can use supervised deep learning which refers to the problem space wherein the target to be predicted is clearly labelled within the data that is used for training and can include convolutional neural networks and recurrent neural networks as well as some of their variants.

A CNN is a multilayer neural network that was biologically inspired by the animal visual cortex. The architecture is particularly useful in image-processing applications. CNN architecture is made up of several layers that implement feature extraction and then classification. The image is divided into receptive fields that feed into a convolutional layer, which then extracts features from the input image. The next step is pooling, which reduces the dimensionality of the extracted features (through down-sampling) while retaining the most important information (typically, through max pooling). Another convolution and pooling step is then performed that feeds into a fully connected multilayer perceptron. The final output layer of this network is a set of nodes that identify features of the image (in this case, a node per identified number). The network is trained by using back-propagation.

Recurrent neural networks can be used, where the recurrent network might have connections that feed back into prior layers (or into the same layer). This feedback allows RNNs to maintain memory of past inputs and model problems in time. RNNs can be unfolded in time and trained with standard back-propagation or by using a variant of back-propagation that is called back-propagation in time (BPTT).

A variant of RNN can be used as well which is the LSTM networks. The LSTM uses the concept of a memory cell. The memory cell can retain its value for a short or long time as a function of its inputs, which allows the cell to remember what's important and not just its last computed value. The LSTM memory cell contains three gates that control how information flows into or out of the cell. The input gate controls when new information can flow into the memory. The forget gate controls when an existing piece of information is forgotten, allowing the cell to remember new data. Finally, the output gate controls when the information that is contained in the cell is used in the output from the cell. The cell also contains weights, which control each gate. The training algorithm, commonly BPTT, optimizes these weights based on the resulting network output error.

The system can work with the gated recurrent unit (GRU) networks which is a simplification of the LSTM. This model has two gates, getting rid of the output gate present in the LSTM model. These gates are an update gate and a reset gate. The update gate indicates how much of the previous cell contents to maintain. The reset gate defines how to incorporate the new input with the previous cell contents. A GRU can model a standard RNN simply by setting the reset gate to 1 and the update gate to 0.

The "perceiver module" 400 will detect and report the emotional interplay between different parties in the media, detecting rapport, mutual interest, engagement, and disengagement.

One implementation of perceiver module 400 is to have one to one association to the weights optimized by BPTT for a data set labeled for a particular audience. The system thus maintains different labels for the training data. For example, the weights optimized for the training data labeled by diverse population of US nationality will be stored in perceiver module with it's association to the audience which labeled the data, in this case of US Nationality. The perceiver module thus uses different weights based on the input #2 Audience Identity Features. Following is a pseudo code demonstrating perceiver module in one such implementation.

PercieverModule(MediaFeatureArray, AudienceIdentity, Context, Detect, Predict)

```
{
  If( Detect)
  {
    WeightsToUse = RetreiveWightsForNativeAudienceOfTheMedia(
MediaFeatureArray, context);
  }
  Else If(Predict)
  {
    If( AudienceIdentity == "US general")
      WeightsToUse = USGeneralLabeledDataWeights;
    Else if( AudienceIdentity == "Female")
      WeightsToUse = FemaleLabeledDataWeights;
    :
    :
  }
}
```

```
EmotionalResponse =
GetEmotionStateFromTrainedNueralNetwork(WeightsToUse);
Return EmotionalResponse;
}
```

The advantage of above approach is to be able to store and maintain many audience identities as set of numbers (weights) which can be stored in a database or a dictionary.

FIG. 5 shows an exemplary Coach Module. The "coach module" 500 considers or infers any or all of the following information that may be available: the context of the recording (interview, date, work meeting, sales call, customer call, etc.) and the role of the speaker (interviewer, interviewee, presenter, etc.), personality traits of the speaker, culture of the speaker, and culture of the audience, and the current/relevant events. The "coach module" generates feedback as one or more coaching tips, suggestions, and/or action prompts live. As illustrated in FIG. 5, a "coach module" takes the following inputs: Input #1: Emotional State(s) of the Audience (Perceived/Detected) Input #2: Emotional state(s) of the user (Perceived/Detected) Input #3: Context of the Interaction Input #4: User's Personality, Goals, and Preferences.

Based on the above input, the "coach module" create output that may contain: Tips, Encouragement, Suggestions, Course of action, Comments, Analysis, and Scores. The "coach module" will detect and report key moments in the conversation where there is a sudden change in tone, emotion, and energy. It will also detect and report monotonous sections in the media.

Following is a pseudo code demonstrating coach module's one such implementation.

CoachModule(AudienceEmotion, UserEmotion, Context, UserPreferences)

```
{
  If(AudienceEmotion = "Fatigue")
  {
    If ( UserPrefereces.NotifyMeWhenAudienceIsTired == true)
    Tip = "Your audience shows signs of fatigue. Want to
    suggest a break?";
  }
  If(UserEmotion = "Anxious")
    Tip = "Take a deep breath, and smile."
    :
    :
  }
  Return Tip;
}
```

An alternate implementation of Coach Module can rely on an AI tip generator which uses creative AI like OpenAI GPT-3 model family: 'text-davinci-003' or previous InstructGPT models. Starting with a set of human coach written tips, prompts, we collect a dataset of labeler demonstrations of the desired model behavior, which we use to fine-tune GPT-3 models using supervised learning. We then collect a dataset of rankings of model outputs, which we use to further fine-tune this supervised model using reinforcement learning from human coach feedback.

As shown in FIG. 6, the "Emotion Association Database" 130 notes down the associations between the media snippet (start and end times) and the emotion value. The database refers to the blob (E.g. Azure blob, AWS blob) location where the actual media is stored. The 130 module is used to create reports and queries to retrieve and play a specific part within the media which includes a certain emotion.

For a example an SQL select query can be performed to find all the media snippets which has an emotion "Nervous".

SELECT SnippetStartTime, SnippetEndTime FROM EmotionAssociationTable
WHERE EmotionFound="Nervous"

Such query will return exact snippets marked with start and end times within the media where the given emotion is found. This result is used then to create reports for users. The advantage of this approach is that user can selectively review only relevant portions of the media and enjoy significant time saving.

The database module 130 is then used to create various reports and analytics by using tools like powerBI/Tableau.

Thus "Emotion Detection, Prediction, and Coaching System" can detect or predict users' emotional responses and different types of audiences live or retrospectively. The detected and/or predicted user and audience responses, along with cultural context and user goals and preferences, are used to coach the user with a suggested course of action.

In one aspect, for a call center agent computer, the system includes code for providing call-center agent with advice to improve agent to human interaction.

Interview/Customer calls Algorithm
1. Pre-processing to determine the different attendees
2. Extract
   a. speech to text for each attendee
   b. tonal changes from baseline for each attendee
   c. visual indicators outside baseline for each attendee
3. Determine the sequence of emotion change for each attendee based on the combined text, tonal and visual vectors
4. Identify red flags (sequences of emotions which are outside the expected range), key moments (sequences of emotions which indicate rapport and connection)
5. Flag, annotate, and provide tips for the specific attendee
6. Retain data for testing and training
7. Create a report with media snippets showing emotions that user is interested to review Similar algorithm will be used, for online dating platform, where the definition of red flag and key moment will be different than the customer call scenario.

The system thus provides the ability to:
process live/pre-recorded media which may contain multiple speakers, music, visuals, etc.
identify and distinguish a broader range of high-level emotions (confidence, engagement, etc.) expressed and/or can be perceived by an audience than the basic three-four classes of tones/sentiments.
predict how different audiences (genders, sexual orientations, ages, cultures, nationality, etc.) will perceive and emotionally respond to the content of the media stream.
predict how a subject (customer, interviewee, student, etc.) will perceive and emotionally respond to the content of the media stream in a given context (sales meeting, work meeting, date, interview, student, etc.)
identify the level of energy from audio and video.
function on one or multiple of the modalities present in media: Audio, Video, and Word usage.
identify high-level emotion from voice tone frees the system from transcription errors and language, accent, and culture limitations.
provide commentary/retrospect on the emotional dynamics of the media clip/stream/snippet.
annotate emotional analysis on the media clip/stream/snippet.

provide live intervention in the form of tips, encouragement, course corrections, and call to action to the users based on the emotional state of their audience.

In one embodiment to coach call center personnel, call/meeting recordings in the call centers are randomly selected for review. The system can automatically recommend insights that can be used for quality and training purposes. The AI approach of FIG. 7 is quick and provides crucial emotional data like engagement, frustration, assurance, among other recommendations, to the call center agent.

In one implementation as shown in FIG. 7, a system is provided for commentary/retrospect analysis by annotating a media stream to assign a speaker's emotion and energy level by analyzing voice tone and/or word choice and/or body language. The media stream may be audio, video, or an audio and video stream. The media stream may be pre-recorded and uploaded for analysis. Alternatively, the media stream may be analyzed live through online meetings, media-broadcast, or presentations in real-time. The emotions, energy, and coaching feedback will be generated and stored for later queries, reports, and analytics. Such analytics, feedback, and emotions can be annotated on the input media clip to provide embedded frame-by-frame analysis.

The media stream or clip may be divided into a plurality of time snippets, for example, 1 second to 3 seconds and/or per speaker in the clip, and separately analyzed throughout the media clip. The snippets may be calculated to determine the overall or average emotional state of the subject of the media clip.

The system may identify a speaker's expressed/perceived emotional state by analyzing a combination of tone and/or word usage and/or body language and assigning an emotion label. The combination of the user's tone, word choice, and facial expression are analyzed to assign an emotional state like (and not limited to): excited, cheerful, pleased, passionate, composed, poised, relaxed, mellow, stressed, tense, nervous, uneasy, thinking, surprised, annoyed, weary, tired, disengaged, fatigued, reasoning, doubtful, or confident.

Engagement scores, positivity scores, and variation scores will be calculated.

The system will detect and report the emotional interplay between different parties in the media detecting rapport, mutual interest, engagement, and disengagement.

The system will detect and report key moments in the conversation where there is a sudden change in tone, emotion, and energy. It will also detect and report monotonous sections in the media.

With reference to the screenshots of FIG. 10, a media annotator 600 that annotates the media stream with a word or symbol, such as an emoji label, is provided. Each time snippet displayed on the screen is annotated with a symbol such as an emoji representing the emotion label and energy level expressed by the speaker during the time snippet.

The coaching feedback may be displayed simultaneously with the emotion and/or energy labels. Feedback statements such as kudos or tips associated with a specific emotional state or energy level may be displayed to coach the user. For example, kudos or encouraging statements are generated for empowering emotional states. Tips may be provided for disempowering emotions to direct the user to modify voice tone, body language or word choice. Customized feedback statements in the form of kudos or tips are displayed for an assigned emotional state. The feedback statement informs the best possible action to communicate better with the given audience.

Next, an embodiment with Live Intervention is detailed. According to the system of FIG. 8, a system is provided for attending live events. One such embodiment of live events is an online meeting. The system can analyze a live event and provide timely interventions via appropriate tips based on the attendees' emotional states, meeting context, and cultural context. The emotions, energy, and coaching feedback will be generated and stored for later queries, reports, and analytics. Such analytics, feedback, and emotions will be communicated to the user via messages, annotations, and events.

A meeting bot joins the meeting along with the user of the system. The meeting bot streams the media (audio/video) from attendees and users to the "Emotion Detection, Prediction and Coaching system."

The system may identify an attendee's expressed/perceived emotional state by analyzing a combination of tone and/or word usage and/or body language and assigning an emotion label. The combination of the attendee's tone, word choice, and facial expression are analyzed to assign an emotional state like (and not limited to): excited, cheerful, pleased, passionate, composed, poised, relaxed, mellow, stressed, tense, nervous, uneasy, thinking, surprised, annoyed, weary, tired, disengaged, fatigued, reasoning, doubtful, or confident.

Engagement scores, positivity scores, and variation scores will be calculated.

The system will detect and report the emotional interplay between different parties in the media, detecting rapport, mutual interest, engagement, and disengagement.

The system will detect and report key moments in the conversation where there is a sudden change in tone, emotion, and energy. It will also detect and report monotonous sections in the media.

A "meeting dashboard" 700 module will be provided. As shown in screenshot of FIG. 11 "meeting dashboard" will show customized coaching feedback for the user.

As shown in snapshots FIG. 11, an engagement meter for the meeting will be provided.

The analysis for the current speakers will be shown.

The user's engagement level with respect to the average engagement of the attendees will be shown.

The live intervention will be provided through tips, kudos, and key moment detection.

An example cloud architecture with data flow chart is shown in FIG. 9.

In addition to the above online meeting embodiment of the live intervention aspect, other embodiments could be implemented in (i) Online meeting platforms and social media (ii) Robots and self-guided autonomous platforms, (iii) virtual reality headsets and wearable devices, and (iiv) augmented reality headsets and wearable devices.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. Computer readable program instructions described herein can be stored in memory or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Python has a large amount of libraries that are super handy for implementing sentiment analysis or machine learning from scratch. NLTK, or the Natural Language Toolkit, is one of the leading libraries for building Natural Language Processing (NLP) models, thus making it a top solution for sentiment analysis. It provides useful tools and algorithms such as tokenizing, part-of-speech tagging, stemming, and named entity recognition. SpaCy is an industrial-strength NLP library in Python which can be used for building a model for sentiment analysis. It provides interesting functionalities such as named entity recognition, part-of-speech tagging, dependency parsing, and word vectors, along with key features such as deep learning integration and convolutional neural network models for several languages. Scikit-learn is a machine learning toolkit for Python that is excellent for data analysis. It features classification, regression, and clustering algorithms. TensorFlow is the dominant framework for machine learning in the industry. It has a comprehensive ecosystem of tools, libraries, and community resources that lets developers implement state-of-the-art machine learning models. PyTorch is another popular machine learning framework that is mostly used for computer vision and natural language processing applications. Developers love PyTorch because of its simplicity; it's very pythonic and integrates really easily with the rest of the Python ecosystem. PyTorch also offers a great API, which is easier to use and better designed than TensorFlow's API. Keras is a neural network library written in Python that is used to build and train deep learning models. It is used for prototyping, advanced research, and production. CoreNLP is Stanford's proprietary NLP toolkit written in Java with APIs for all major programming languages to extract the base of words, recognize parts of speech, normalize numeric quantities, mark up the structure of sentences, indicate noun phrases and sentiment, extract quotes, and much more. OpenNLP is an Apache toolkit designed to process natural language text with machine learning and supports language detection, tokenization, sentence segmentation, part-of-speech tagging, named entity extraction, chunking, parsing, and conference resolution. Weka is comprised of a set of machine learning algorithms for data mining tasks. It includes tools for data preparation, classification, regression, clustering, association rules mining, and visualization. R is a programming language that is mainly used for statistical computing. Its most common users include statisticians and data miners looking to develop data analysis. Caret package includes a set of functions that streamline the process of creating predictive models. It contains tools for data splitting, pre-processing, feature selection, model tuning via resampling, and variable importance estimation. Mlr is a framework that provides the infrastructure for methods such as classification, regression, and survival analysis, as well as unsupervised methods such as clustering.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments.

Additionally, it is understood in advance that the teachings recited herein are not limited to a particular computing environment. Rather, embodiments are capable of being implemented in conjunction with any type of computing environment now known or later developed. For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. The software/system may be offered based the following service models:

Software as a Service (Saas): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

A cloud computing environment is service oriented with a focus on statelessness, low coupling, modularity, and semantic interoperability. At the heart of cloud computing is an infrastructure comprising a network of interconnected nodes. Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT®.NET®, web services, and rich site summary (RSS). In some implementations, a UI may be included in a stand-alone client (for example, thick client, fat client) configured to communicate (e.g., send or receive data) in accordance with one or more of the aspects described.

Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

In embodiments, the system can include a computer program product embodied in a non-transitory computer-readable medium for machine-trained analysis, the computer program product comprising code that causes one or more processors to perform operations of emotion detection and coaching.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims or requested exclusivity rather than by the foregoing description. All changes that come within the meaning and range of equivalency of the requested exclusivity are to be embraced within their scope.

What is claimed is:

1. A method to improve human communication, comprising:
    extracting features from a plurality of media streams;
    providing the extracted features to a deep learning machine and predicting an emotional response for a given audience; and
    annotating a user media stream with a feedback statement and an emotion label for a coach to help a user to improve human communication based on the predicted emotional response.

2. The method of claim 1, comprising receiving text, voice, and video stream of a face and detecting emotion from the face.

3. The method of claim 2, comprising receiving text, voice, and video stream of a body posture.

4. The method of claim 1, comprising performing commentary/retrospect analysis by annotating a media stream to assign a speaker's emotion and energy level.

5. The method of claim 1, comprising analyzing voice tone and/or word choice and/or body language.

6. The method of claim 1, wherein the media stream comprises audio, video, or an audio and video stream, comprising coaching with emotional insights in real-time during one or more of: live scenario, online meeting, therapy session, and webinar.

7. The method of claim 1, comprising pre-recording and uploading the media streams for analysis.

8. The method of claim 1, comprising analyzing the media streams live through online meetings, media-broadcast, or presentations in real-time.

9. The method of claim 1, comprising generating emotions, energy, and coaching feedback for subsequent queries, reports, and analytics.

10. The method of claim 1, comprising capturing live events or online meetings and providing timely interventions with tips based on user emotional states, meeting context, and cultural context.

11. The method of claim 1, comprising annotating analytics, feedback, or emotions on an input media clip and providing embedded frame-by-frame analysis.

12. The method of claim 1, comprising generating a coaching feedback and communicating the coaching feedback to the user in real-time through messages, annotations, or events.

13. The method of claim 1, comprising detecting emotion by a robot and improving robot-human communications.

14. The method of claim 1, comprising coaching a call-center agent with the predicted emotional response.

15. A system to improve human communication, comprising:
- a processor;
- a camera to capture video media stream;
- a microphone to capture sound media stream;
- a media feature extractor for extracting features from the video and sound media streams;
- a perceiver module coupled to the media feature extractor for providing the extracted features to a deep learning machine and predicting an emotional response for a given audience; and
- a coaching module coupled to the perceiver module for improving human communication based on the predicted emotional response including a user interface to annotate a user media stream with a feedback statement and an emotion label.

16. The system of claim 15, comprising, comprising means for detecting facial movements and correlating the facial movements with voice of a human to predict the emotional response.

17. The system of claim 15, comprising a call center agent computer, comprising means for providing call-center agent with advice to improve agent to human interaction.

18. The system of claim 15, comprising a vehicular computer, comprising a user interface for providing driver feedback to improve safety based on the predicted emotional response.

19. The system of claim 15, comprising a robot, comprising a user interface for providing human feedback by the robot based on the predicted emotional response.

20. The system of claim 15, comprising an emotion association database to store historical media feature, perceiver output, and context as reference data.

* * * * *